Aug. 9, 1932.  H. F. DRAKE  1,870,559
ARTIFICIAL BAIT
Filed Feb. 27, 1931
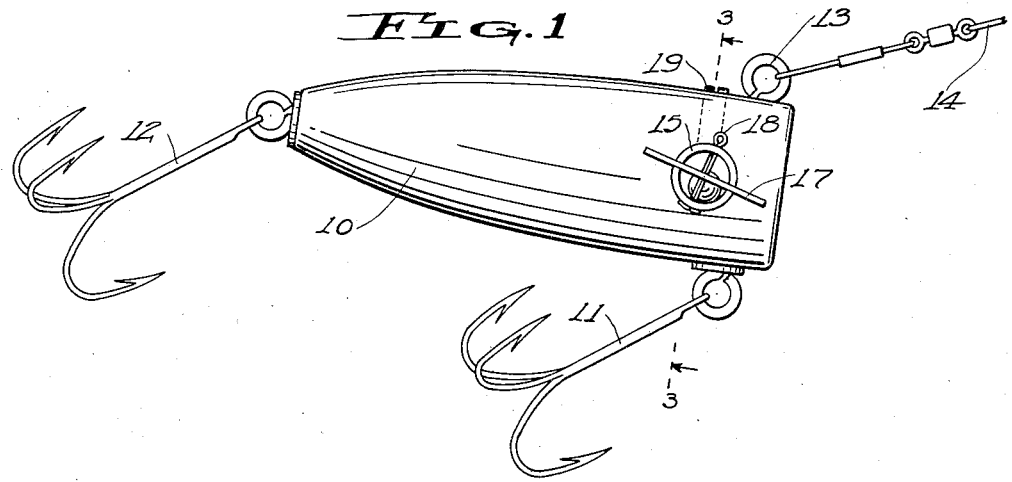
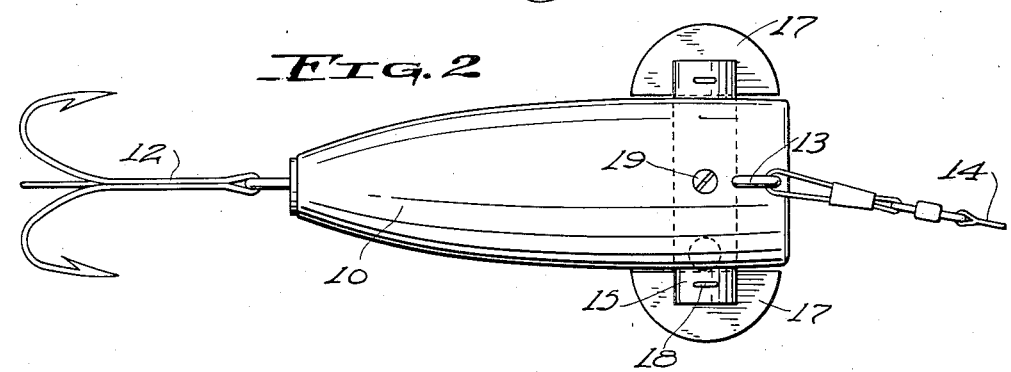
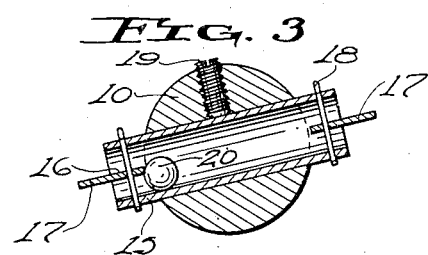
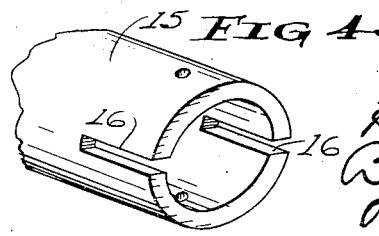

Patented Aug. 9, 1932

1,870,559

UNITED STATES PATENT OFFICE

HARRY F. DRAKE, OF MILWAUKEE, WISCONSIN

ARTIFICIAL BAIT

Application filed February 27, 1931. Serial No. 518,601.

This invention has for its object to provide a lure with adjustable vanes, by means of which it may be made to travel at any desired depth below the surface of the water.

Another object of the invention is to provide a lure which may be made to rock from side to side and to travel in a sinuous path, dodging from right to left in a natural and attractive manner.

Another object of the invention is to provide such a lure which will produce an audible clicking noise in its travel through the water incident to the change in tilting position thereof.

Another object of the invention is to provide a lure with an air passageway therethrough, through which air may stream in the swift travel at the surface and be discharged beneath the surface to form a wake of bubbles and to produce a gurgling noise to form an attraction.

Another object of the invention is to provide a lure having these characteristics and capable of having parts readily removable as well as adjustable to accomplish modifications and variations therein to suit conditions or to comply with the whims of the user.

With the above and other objects in view the invention consists in the artificial bait as herein claimed and all equivalents.

Referring to the accompanying drawing, in which like characters of reference indicate the same parts in different views, Fig. 1 is a side view of the bait of this invention as it travels beneath the surface while the line is being reeled in;

Fig. 2 is a plan view thereof;

Fig. 3 is a transverse sectional view through the tube showing the tilting effect of the ball therein, on the plane of line 3—3 of Fig. 1, and Fig. 4 is a perspective view of one end of the tube.

In the drawing, 10 indicates the body of the lure of the plug type having bottom and end gang hooks 11 and 12 respectively, and having an attaching eye 13 at the top of its front end for connection with the line 14, said front end of the body being preferably blunt or cut off in a plane at right angles to the longitudinal axis of the body as shown, though any other desired shape may be given thereto to affect its travel through the water.

Extending transversely through the body 10 and preferably near the front end thereof is a metal tube 15 with its ends projecting slightly beyond the sides of the body, where they are provided with slots 16, within which are fastened metal blades forming vanes 17. These are preferably semicircular in shape, though they may be of other shape, and are let into the slots 16 where they are held by pins 18 passing through them as well as through the ends of the tube. These pins may be rivets but are shown as cotter pins so that they may be easily removed and replaced. The two vanes 17 may occupy the same plane, as shown, but that may be adjusted to any angle with respect to the axis of the body by turning the tube within the bore through which it passes and it may be locked in the desired position by a set screw 19.

One or more balls or weights 20 may be confined within the tube between the vanes 17 to roll from one side to the other and so unbalance the body as it rocks from side to side, serving to prolong the duration of the tilting position and effect a wide, sweeping curved line of travel and producing a clicking noise by the ball striking the stops formed by the vanes with each change of tilting position.

In use the vanes 17 may be set to any desired inclined position by turning the tube while the set screw is released and are then locked in that position by tightening the set screw. By this adjustment it is determined whether the lure will travel along the surface of the water as the line is reeled in or at some desired depth according to the speed of travel, the inclined vanes serving to pull downwardly the body which would otherwise float. The rocking motions inherent with a bait of this type, making the body tilt from side to side, cause the vanes to act upon the water in such a way as to effect wide sweeping curves from side to side so that the bait does not travel in a straight line but darts from right to left and the period of action in each direction is prolonged by the overbalancing effect produced by the weight of the ball at one end of the tube. At the end of the sweeping movement to one side the bait straightens up and tilts to the other side, thus shifting the ball to the other end of the tube where it serves to contribute to the diverting effect of the vanes to prolong the duration of the sweeping side movement to the other side. The bait is thus reeled in in a sinuous line of travel, darting from side to side with greater speed and with life-like action, making it attractive. With each change in inclination there is produced a metallic click that adds to its attractiveness as a lure. Furthermore, when used at the surface, the inclination of the bait causes the advanced end of the tube to admit air and water, which gush through the tube and are discharged at the other end as a stream of air bubbles leaving a trail or wake materially adding to the attractiveness and at the same time producing a gurgling sound.

The metal ball, being of much smaller diameter than the bore of the tube, does not materially obstruct the flow of water therethrough, but, should it be desired to increase this effect or to dispense with the influence of the ball, one of the vanes may be removed by withdrawing its cotter pin, permitting the ball to be removed, or, should it be desired to use the tube alone, both vanes can be so removed.

Since fish are very sensitive to sound, which is readily transmitted through water, this bait is made to appeal by the sounds it produces both by the metallic click of the ball and by the surge of air bubbles producing a gurgling sound that is unique and effective.

Whether the shifting of the weight of the metal ball as it rolls back and forth inside the tube gives the bait the slight rolling action to produce the side to side zig-zag course as it is drawn through the water, or whether the natural slightly zig-zag course produces the shifting of the weight of the ball in the tube to prolong the duration of each digression, the effect of the combination is the same as before stated and, instead of taking a comparatively straight line of travel, the bait speedily darts from side to side, producing the action and the sounds mentioned and giving a close imitation of a swimming fish.

It is obvious that, if only the effect of the diving vanes is desired, they may be attached to a solid shaft instead of to a hollow tube. In practice it is found desirable to make the tube and vanes of aluminum, but obviously they may be of other material.

What I claim as new and desire to secure by Letters Patent is:

1. In an artificial bait, a body, a shaft passing transversely therethrough, diving vanes on the ends of the shaft adjustably inclined by turning the shaft, and a set screw in the body engaging the shaft for locking it in its adjustments.

2. In an artificial bait, a body, a guide extending transversely therethrough, and a laterally inclining shiftable weight guided thereby for causing the body to incline alternately to the right and the left.

3. In an artificial bait, a body, a guide tube passing transversely therethrough, and a body-inclining ball loosely contained within the tube for shifting its weight from one side of the body to the other to cause the body to incline alternately to the right and the left.

4. In an artificial bait, a body, means for causing the body to tilt from side to side, and means therein for producing a sound as the body tilts from side to side.

5. In an artificial bait, a body, means for tilting the body from side to side and producing a sound as the body tilts from side to side, comprising a tube extending transversely through the body, and a ball contained in the tube and rolling from end to end thereof.

6. In an artificial bait, a body, a tube passing transversely therethrough having slots in its ends, plates fitting in the slots forming depth vanes, and pins passing through the ends of the tube and through the plates.

7. In an artificial bait, a body, a tube passing transversely therethrough having slots in its ends, plates fitting in the slots and forming depth vanes, pins passing through the ends of the tube and through the plates for locking them in place, and a ball confined in the tube between the plates.

8. In an artificial bait, a body, a metal tube extending transversely therethrough and having slots in its ends, plates fitting in the slots and forming depth vanes, pins passing through the ends of the tube and through the plates for locking them in place, a ball confined within the tube between the plates, said tube being capable of being turned in the body for varying the pitch of the depth vanes, and a set screw threaded through the body and engaging the tube for locking it in its adjustments.

In testimony whereof, I affix my signature.

HARRY F. DRAKE.